US010454109B2

(12) United States Patent
Ohira et al.

(10) Patent No.: US 10,454,109 B2
(45) Date of Patent: Oct. 22, 2019

(54) PLATE-SHAPED LITHIUM COMPOSITE OXIDE

(71) Applicant: NGK INSULATORS, LTD., Nagoya-Shi (JP)

(72) Inventors: Naoto Ohira, Nagoya (JP); Yukinobu Yura, Nagoya (JP); Shigeki Okada, Nishio (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 15/952,540

(22) Filed: Apr. 13, 2018

(65) Prior Publication Data
US 2018/0233744 A1 Aug. 16, 2018

Related U.S. Application Data

(63) Continuation of application No. PCT/JP2017/006548, filed on Feb. 22, 2017.

(30) Foreign Application Priority Data

Feb. 24, 2016 (JP) ................................ 2016-032944
Apr. 25, 2016 (JP) ................................ 2016-087110

(51) Int. Cl.
*H01M 4/525* (2010.01)
*H01M 4/131* (2010.01)
(Continued)

(52) U.S. Cl.
CPC ............ *H01M 4/525* (2013.01); *C01G 51/42* (2013.01); *H01M 4/131* (2013.01);
(Continued)

(58) Field of Classification Search
CPC .. H01M 4/525; H01M 4/1391; H01M 4/0409; H01M 4/0471; H01M 4/131;
(Continued)

(56) References Cited

U.S. PATENT DOCUMENTS

2002/0074972 A1    6/2002  Narang et al.
2009/0104528 A1*   4/2009  Takahashi ............... H01M 4/13
                                                         429/223
(Continued)

FOREIGN PATENT DOCUMENTS

JP    2003-132887 A1    5/2003
JP    2005-243371 A1    9/2005
(Continued)

OTHER PUBLICATIONS

Bates, J.B., et al. "Preferred Orientation of Polycrystalline LiCoO2 Films", Journal of the Electrochemical Society, vol. 147, pp. 59-70, published 2000. (Year: 2000).*
(Continued)

*Primary Examiner* — Sarah A. Slifka
*Assistant Examiner* — Lilia Nedialkova
(74) *Attorney, Agent, or Firm* — Burr & Brown, PLLC

(57) ABSTRACT

The plate-shaped lithium composite oxide is configured by a plurality of mutually bonded primary particles respectively composed of a lithium composite oxide having a layered rock-salt structure. When fully charged, an expansion-contraction ratio E in a plate face direction parallel to a plate face is less than or equal to 0.5%.

4 Claims, 7 Drawing Sheets

(51) Int. Cl.
*H01M 4/1391* (2010.01)
*C01G 51/00* (2006.01)
*H01M 4/02* (2006.01)
*H01M 10/052* (2010.01)
*H01M 10/0562* (2010.01)
*H01M 10/0525* (2010.01)
*H01M 10/0585* (2010.01)
*H01M 4/04* (2006.01)

(52) U.S. Cl.
CPC ....... *H01M 4/1391* (2013.01); *H01M 10/052* (2013.01); *H01M 10/0525* (2013.01); *H01M 10/0562* (2013.01); *H01M 10/0585* (2013.01); *C01P 2006/40* (2013.01); *H01M 4/0409* (2013.01); *H01M 4/0471* (2013.01); *H01M 2004/021* (2013.01); *H01M 2004/028* (2013.01)

(58) Field of Classification Search
CPC .......... H01M 10/052; H01M 10/0525; H01M 10/0562; H01M 10/0585; H01M 2004/021; H01M 2004/028; C01P 2006/40; C01G 51/42
See application file for complete search history.

(56) References Cited

U.S. PATENT DOCUMENTS

| | | |
|---|---|---|
| 2010/0112443 A1 | 5/2010 | Blomgren et al. |
| 2010/0159332 A1 | 6/2010 | Sugiura et al. |
| 2011/0195310 A1* | 8/2011 | Kawamoto ........... H01M 4/131 429/231.3 |
| 2015/0236374 A1 | 8/2015 | Asano et al. |
| 2017/0317334 A1 | 11/2017 | Yura et al. |

FOREIGN PATENT DOCUMENTS

| | | |
|---|---|---|
| JP | WO2010/074304 A1 | 7/2010 |
| WO | 2010/074314 A1 | 7/2010 |
| WO | 2015/029289 A1 | 3/2015 |
| WO | 2016/117499 A1 | 7/2016 |

OTHER PUBLICATIONS

U.S. Appl. No. 15/952,571, filed Apr. 13, 2018, Yukinobu Yura et al.
U.S. Appl. No. 15/952,593, filed Apr. 13, 2018, Yukinobu Yura et al.
U.S. Appl. No. 15/952,620, filed Apr. 13, 2018, Yukinobu Yura et al.
International Search Report and Written Opinion (Application No. PCT/JP2017/006548) dated May 30, 2017 (with English translation).
Extended European Search Report (Application No. 17756526.4) dated Jun. 5, 2018.
English Translation of International Preliminary Report on Patentability and Written Opinion, International Application No. PCT/JP2017/006548, dated Sep. 7, 2018 (8 pages).
European Office Action, European Application No. 17 756 526.4, dated Feb. 6, 2019 (6 pages).
European Office Action (Application No. 17 756 526.4) dated Jun. 28, 2019.

* cited by examiner

SAMPLE NO. 11

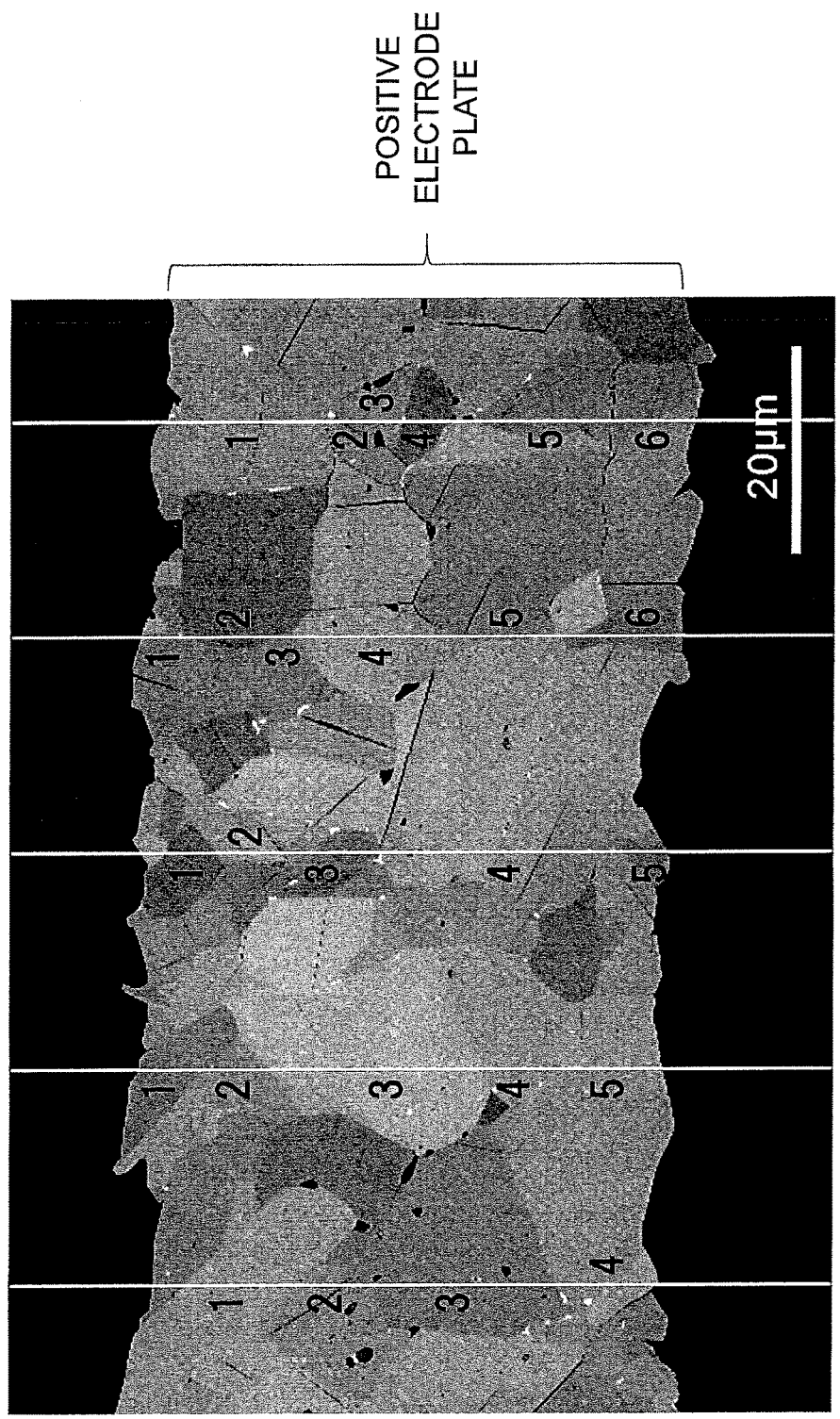

PLATE-SHAPED LITHIUM COMPOSITE OXIDE

BACKGROUND OF THE INVENTION

1. Field of the Invention

The present invention relates to a plate-shaped lithium composite oxide.

2. Description of Relate Art

A typical positive electrode for a lithium ion battery is configured by a plate-shaped lithium composite oxide which is configured by bonding of a plurality of primary particles composed of a lithium composite oxide having a layered rock-salt structure.

A method has been proposed to orientate the (003) plane of the primary particles in a direction that intersects the plate face to thereby enable exposure on the plate face of the crystal plane that facilitates intercalation and deintercalation of lithium ions (reference is made to PCT Laid Open Application 2010/074304).

SUMMARY OF THE INVENTION

On the other hand, the primary particles that configure the plate-shaped lithium composite oxide expand and contract in a direction that is perpendicular to the (003) plane in response to the intercalation and deintercalation of lithium ions.

Therefore when there is an increase in the angle of the (003) plane relative to a plate face direction that is parallel to the plate face, there is an increase in the expansion-contraction amount in the plate face direction of the plate-shaped lithium composite oxide. Consequently, there is a risk that the positive electrode will peel from the solid electrolyte layer or that a defect will be caused in the solid electrolyte layer that is in contact with the positive electrode.

However, Patent Literature 1 does not consider the orientation angle of primary particles from the point of view of the expansion-contraction amount of the plate-shaped lithium composite oxide.

The present invention is proposed based on the new insight above, and has the object of providing a plate-shaped lithium composite oxide that can inhibit peeling of the positive electrode and/or a defect in the solid electrolyte layer.

Solution to Problem

The plate-shaped lithium composite oxide according to the present invention is used as the positive electrode of a lithium ion battery provided with a solid electrolyte layer. The plate-shaped lithium composite oxide is configured by a plurality of mutually bonded primary particles respectively composed of a lithium composite oxide having a layered rock-salt structure. When fully charged, the expansion-contraction ratio E in a plate face direction which is parallel to the plate face is less than or equal to 0.5%.

Advantageous Effects of Invention

The present invention provides a plate-shaped lithium composite oxide that can inhibit peeling of the positive electrode and/or a defect in the solid electrolyte layer.

BRIEF DESCRIPTION OF DRAWINGS

FIG. 7 illustrates a method of calculating the average number of primary particles in a thickness direction in Sample No. 1.

DETAILED DESCRIPTION OF THE INVENTION

Lithium Ion Battery 100

Figure 1:
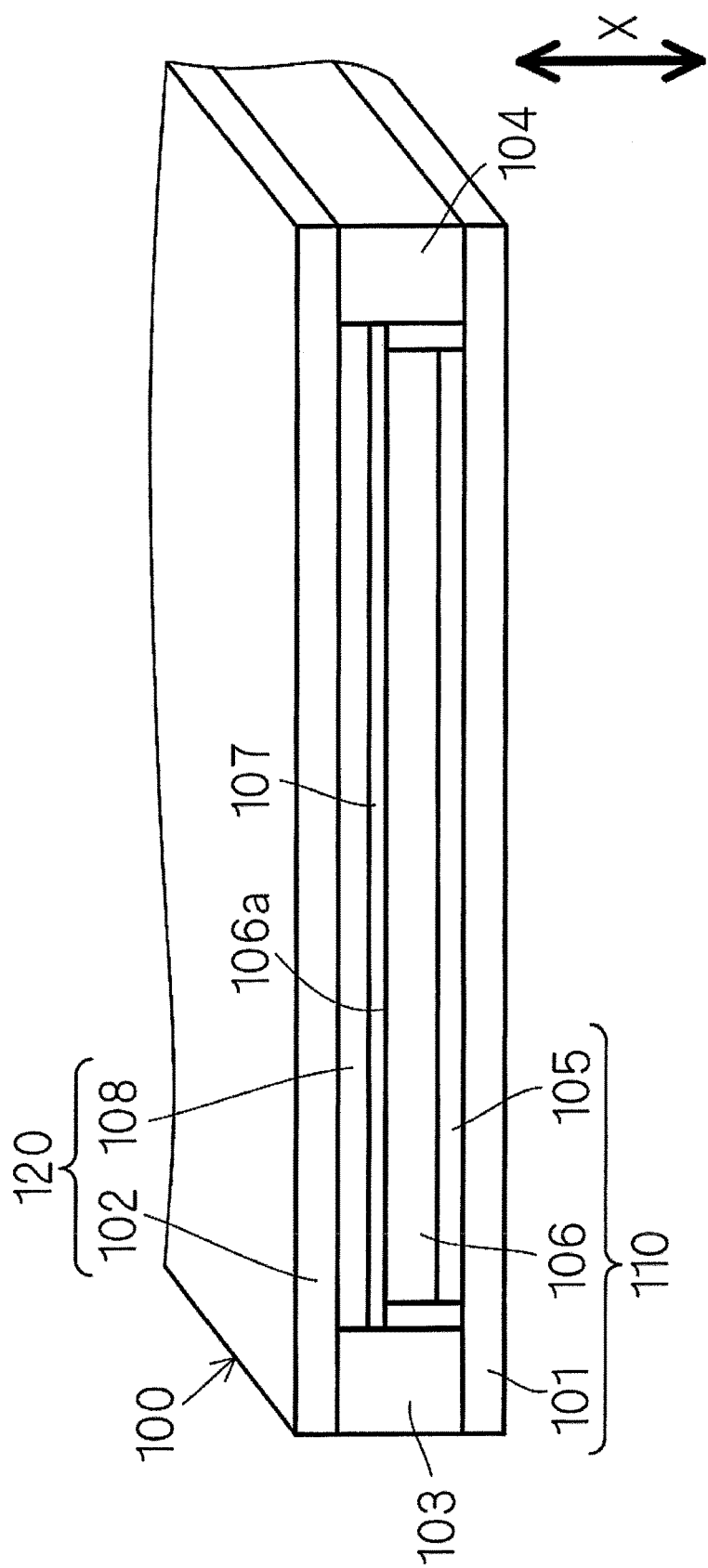
FIG. 1 is a cross sectional view schematically illustrating a configuration of a lithium ion battery.

FIG. 1 is a cross sectional view schematically illustrating a configuration of a lithium ion battery 100. A chip-type lithium battery 100 that is configured as a plate piece is a secondary battery (rechargeable battery) that is capable of repetitive use as a result of charging and discharging.

The lithium battery 100 comprises a positive electrode-side current collecting layer 101, a negative electrode-side current collecting layer 102, outer cladding 103, 104, a current collecting connection layer 105, a positive electrode plate 106, a solid electrolyte layer 107 and the negative electrode layer 108. The lithium ion battery 100 has a configuration in which the positive electrode-side current collecting layer 101, the current collecting connection layer 105, the positive electrode plate 106, the solid electrolyte layer 107, the negative electrode layer 108 and the negative electrode-side current collecting layer 102 are sequentially stacked in a stacking direction X.

The end portion in the direction of plate width of the lithium ion battery 100 is sealed by the outer cladding 103, 104. A positive electrode portion 110 is configured by the positive electrode-side current collecting layer 101, the current collecting connection layer 105 and the positive electrode plate 106. A negative electrode portion 120 is configured by the negative electrode-side current collecting layer 102 and the negative electrode layer 108.

1. Positive Electrode-Side Current Collecting Layer 101

The positive electrode-side current collecting layer 101 is disposed on an outer side of the positive electrode plate 106. The positive electrode-side current collecting layer 101 is mechanically and electrically connected through the current collecting connection layer 105 to the positive electrode plate 106. The positive electrode-side current collecting layer 101 can function as a positive electrode current collector.

The positive electrode-side current collecting layer 101 can be composed of metal. The metal that configures the positive electrode-side current collecting layer 101 includes stainless steel, aluminum, copper, platinum, nickel and the like, with stainless steel being particularly suitable. The positive electrode-side current collecting layer 101 may be formed in a plate shape or a foil shape, with a foil shape being particularly preferred. Therefore, use of a stainless steel foil is particularly preferred as the positive electrode-side current collecting layer 101. When the positive electrode-side current collecting layer 101 is shaped as a foil, the thickness of the positive electrode-side current collecting layer 101 may be configured to 1 to 30 μm, preferably as greater than or equal to 5 and less than or equal to 25 and more preferably as greater than or equal to 10 and less than or equal to 20 μm.

2. Negative Electrode-Side Current Collecting Layer 102

The negative electrode-side current collecting layer 102 is disposed on an outer side of the negative electrode layer 108. The negative electrode-side current collecting layer 102 is mechanically and electrically connected to the negative electrode layer 108. The negative electrode-side current collecting layer 102 can function as a negative electrode current collector. The negative electrode-side current collecting layer 102 can be composed of metal. The negative electrode-side current collecting layer 102 can be composed of the same material as the positive electrode-side current collecting layer 101. Therefore use is preferred of a stainless steel foil as the negative electrode-side current collecting layer 102. When the negative electrode-side current collecting layer 102 is shaped as a foil, the thickness of the negative electrode-side current collecting layer 102 may be configured to 1 to 30 μm, preferably as greater than or equal to 5 and less than or equal to 25 μm, and more preferably as greater than or equal to 10 and less than or equal to 20 μm.

3. Outer Cladding 103, 104

The outer cladding 103 and 104 seals a gap between the positive electrode-side current collecting layer 101 and the negative electrode-side current collecting layer 102. The outer cladding 103 and 104 encloses the lateral side of a unit battery configured by the positive electrode plate 106, the solid electrolyte layer 107 and the negative electrode layer 108. The outer cladding 103, 104 inhibits the entry of moisture into the lithium ion battery 100.

In order to ensure electrical insulation between the positive electrode-side current collecting layer 101 and the negative electrode-side current collecting layer 102, the resistivity of the outer cladding 103 and 104 is preferably greater than or equal to $1 \times 10^6$ Ωcm, more preferably greater than or equal to $1 \times 10^7$ Ωcm, and still more preferably greater than or equal to $1 \times 10^8$ Ωcm. This type of outer cladding 103 and 104 may be composed of a sealing material that exhibits electrical insulating characteristics. The sealing material includes use of a resin-based sealing material containing a resin. Use of a resin-based sealing material enables formation of the outer cladding 103 and 104 at a relatively low temperature (for example less than or equal to 400° C.) and therefore it is possible to inhibit damage or deterioration of the lithium ion battery 100 due to heat.

The outer cladding 103 and 104 may be formed by stacking a resin film, by dispensing a liquid resin, or the like.

4. Current Collecting Connection Layer 105

The current collecting connection layer 105 is disposed between the positive electrode-side current collecting layer 101 and the positive electrode plate 106. The current collecting connection layer 105 mechanically bonds the positive electrode plate 106 to the positive electrode-side current collecting layer 101 and electrically bonds the positive electrode plate 106 to the positive electrode-side current collecting layer 101.

The current collecting connection layer 105 includes a conductive material and an adhesive. The conductive material may include use of conductive carbon or the like. The adhesive may include use of an epoxy or the like. Although there is no particular limitation in relation to the thickness of the current collecting connection layer 105, it may be configured as greater than or equal to 5 μm and less than or equal to 100 μm, and preferably greater than or equal to 10 μm and less than or equal to 50 μm.

5. Positive Electrode Plate 106

The positive electrode plate 106 is formed in a plate shape. The positive electrode plate 106 is an example of "a plate-shaped lithium composite oxide". The microstructure of the positive electrode plate 106 will be described below.

Although there is no particular limitation in relation to the thickness of the positive electrode plate 106, it may be configured as greater than or equal to 20 μm, preferably greater than or equal to 25 μm, and more preferably greater than or equal to 30 μm. In particular, a configuration in which the thickness of the positive electrode plate 106 is greater than or equal to 50 μm makes it possible to increase the energy density of the lithium ion battery 100 by ensuring a sufficient active material capacity per unit area. Furthermore although there is no particular limitation on the upper limiting value of the thickness of the positive electrode plate 106, when inhibiting deterioration of battery characteristics (in particular an increase in the resistance value) that results from repetitive charging and discharging is taken into account, a value of less than 200 μm is preferred, a value of less than or equal to 150 μm is more preferred, a value of less than or equal to 120 μm is still more preferred, and a value of less than or equal to 100 μm is particularly preferred.

In this context, an expansion-contraction ratio E of the positive electrode plate 106 in the present embodiment as described below is suppressed to less than or equal to 0.5%. In this manner, when the expansion-contraction ratio E of the positive electrode plate 106 is sufficiently low, even when the thickness of the positive electrode plate 106 is configured to be less than or equal to 30 μm for the purpose of enhancing the rate characteristics of the lithium ion battery 100, it is possible to inhibit peeling of the positive electrode plate 106 and/or a defect in the solid electrolyte layer 107. Therefore the thickness of the positive electrode plate 106 may be suitably set taking into account the expansion-contraction ratio E of the positive electrode plate 106 and the discharge capacity of the lithium ion battery 110.

When a cross section of the positive electrode plate 106 is observed by SEM, the thickness of the positive electrode plate 106 is obtained by measurement of the average distance (average value of a distance at three arbitrary points) between two plate faces that are observed to be substantially parallel.

In the present embodiment, the thickness direction is a direction that is vertical to the direction parallel to the solid electrolyte-side surface 106a (an example of a "plate face") of the positive electrode plate 106 (referred to below as "plate-face direction"), and is substantially the same as the stacking direction X. The solid electrolyte-side surface 106a is defined by an approximately straight line obtained by a least squares method defining the interface between the positive electrode plate 106 and the solid electrolyte layer 107 in a cross sectional face of the positive electrode plate 106.

6. Solid Electrolyte Layer 107

The solid electrolyte layer 107 is preferably composed of a lithium phosphate oxynitride (LiPON) ceramic material that is known to be an oxide-based ceramic material. The thickness of the solid electrolyte layer 107 preferably has a thin configuration to thereby enhance lithium ion conductivity, and may be suitably set by taking into account reliability during charging and discharging (cracking, separator function, inhibiting a defect or the like). The thickness of the solid electrolyte layer 107 for example is preferably 0.1 to 10 μm, more preferably 0.2 to 8.0 μm, still more preferably 0.3 to 7.0 μm, and particularly preferably 0.5 to 6.0 μm.

A sputtering method is preferably used as a method of film formation for attaching the solid electrolyte layer 107, that is formed from a ceramic material, to the solid electrolyte-side surface 106a of the positive electrode plate 106. At that time, the thickness of the solid electrolyte layer 107 can be adjusted by controlling the film formation conditions (for example, film formation time) used in the sputtering method. The positive electrode plate 106 does not tend to cause a defect in battery function even when the battery is configured by forming a solid electrode layer composed of LiPON on the surface by use of a sputtering method.

LiPON is a group of compounds represented by a composition of $Li_{2.9}PO_{3.3}N_{0.46}$, and for example, is a group of compounds represented by $Li_aPO_bN_c$ (wherein, a is 2 to 4, b is 3 to 5, and c is 0.1 to 0.9). Therefore, the formation of a LiPON-based solid electrolyte layer by sputtering may be performed using a lithium phosphate sintered body target as an Li source, a P source and an O source, and carried out according to known conditions by introducing $N_2$ as a gas species for the N source. Although there is no particular limitation on the sputtering method, use of an RF magnetron method is preferred. Furthermore, in substitution for the sputtering method, a film formation method such as an MOCVD method, a sol gel method, an aerosol deposition method, a screen printing or the like may be used.

The solid electrolyte layer 107 may be composed of an oxide-based ceramic material other than a LiPON-based ceramic material. The oxide-based ceramic material other than a LiPON-based ceramic material includes at least one type selected from the group consisting of a garnet-based ceramic material, a nitride-based ceramic material, a perovskite-based ceramic material, a phosphate-based ceramic material and a zeolite-based ceramic material. An example of the garnet ceramic material includes use of an Li—La—Zr—O-based material (specifically $Li_7La_3Zr_2O_{12}$, or the like) and an Li—La—Ta—O-based material. An example of the perovskite-based ceramic material includes use of an Li—La—Ti—O-based material (specifically $LiLa_{1-x}Ti_xO_3$ (0.01≤x≤0.14), or the like). An example of the phosphate-based ceramic material includes use of Li—Al—Ti—P—O, Li—Al—Ge—P—O and Li—Al—Ti—Si—P—O (more specifically $Li_{1+x+y}Al_xTi_{2-x}Si_yP_{3-y}O_{12}$ (0≤x≤0.4, 0≤y≤0.6) or the like).

The solid electrolyte layer 107 may also be composed of a sulfide based material. The sulfide based material includes use of a material selected from a solid electrolyte based on $Li_2S$—$P_2S_5$, LiI—$Li_2S$—$P_2S_5$, LiI—$Li_2S$—$B_2S_{32}$, or LiI—$Li_2S$—$SiS_2$, Thio-LISICON, and Li10GeP2S12, or the like. A sulfide based material is comparatively soft, and therefore the battery can be configured by forming a solid electrolyte layer by compaction pressing of a sulfide-based powder onto the surface of the positive electrode plate 106. More specifically, the solid electrolyte layer can be formed by stacking and pressing a sulfide-based powder body configured in a sheet shape by using a binder or the like onto the positive electrode plate 106, or by pressing after coating and drying a slurry in which a sulfide-based powder is dispersed onto the positive electrode plate 106.

7. Negative Electrode Layer 108

The negative electrode layer 108 is disposed on the solid electrolyte layer 107. The negative electrode layer 108 contains a principal component of lithium metal. The negative electrode layer 108 may be configured as a lithium-containing metal film formed on the solid electrolyte layer 107. The lithium-containing metal film may be formed by a vacuum deposition method, a sputtering method, a CVD method, or the like.

Although there is no particular limitation on the thickness of the negative electrode layer 108, it may be configured as less than or equal to 200 μm. When the feature of increasing an energy density and ensuring a large total lithium amount in the lithium battery 100 is taken into account, it is preferred that the thickness of the negative electrode layer 108 is greater than or equal to 10 μm, preferably greater than or equal to 10 μm and less than or equal to 50 μm, more preferably greater than or equal to 10 μm and less than or equal to 40 μm, and particularly preferably greater than or equal to 10 μm and less than or equal to 20 μm.

Microstructure of Positive Electrode Plate 106

Figure 2:
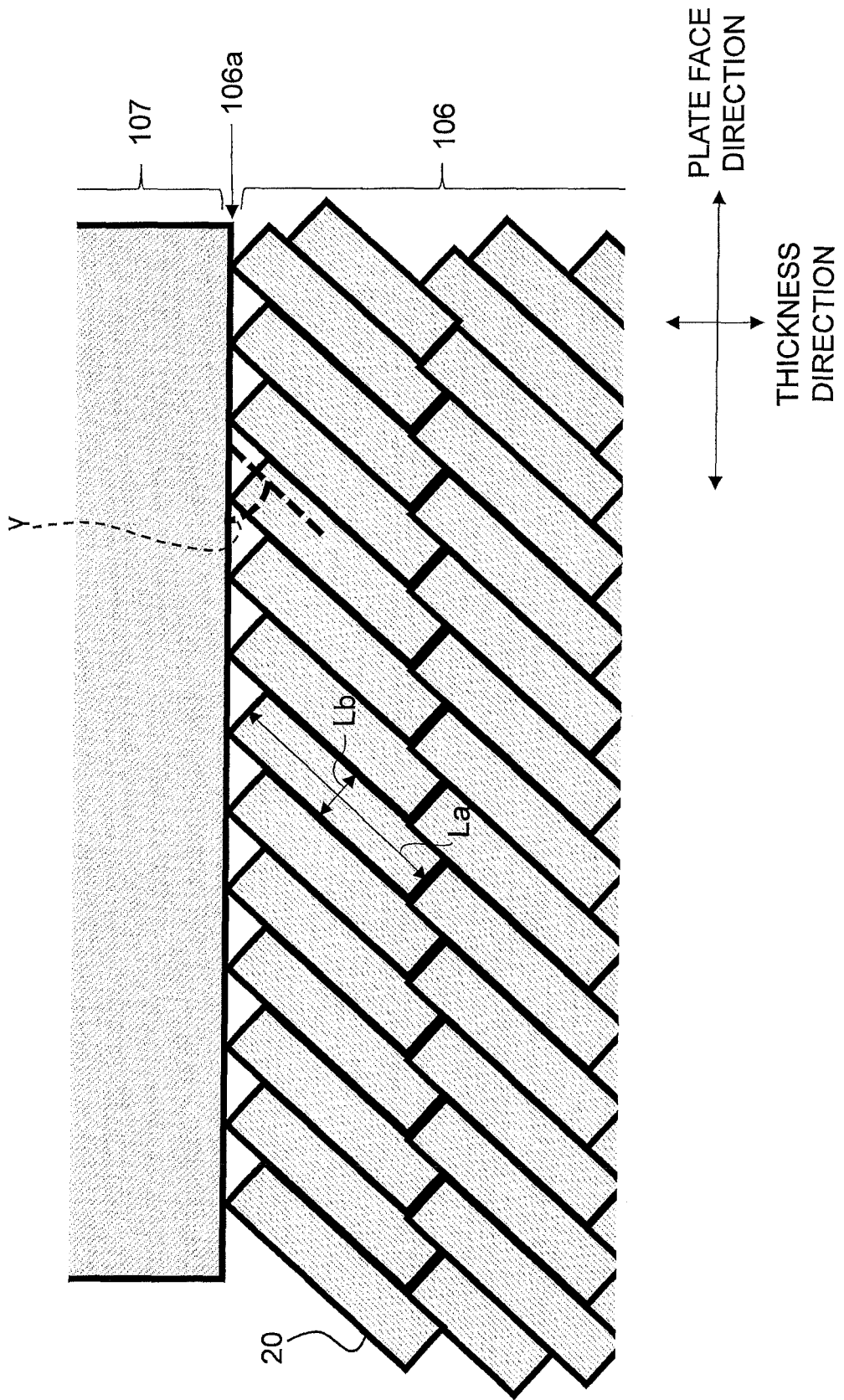
FIG. 2 is a schematic image illustrating a cross section of a positive electrode.

FIG. 2 is a schematic image illustrating a cross section of a positive electrode. The positive electrode plate 106 is formed by bonding of a plurality of primary particles 20. There is no particular limitation on the outer shape of each primary particle 20, and a configuration such as plate-shape, rectangular, cubic and spherical or the like is possible. Primary particles 20 having a different outer shape may be included in the positive electrode plate 106. In the present embodiment, each primary particle 20 is bonded in a plate face direction of the positive electrode and is also bonded in a thickness direction. Each primary particle 20 is a region aligned with the orientation angle and enclosed by the crystal grain boundary in the SEM image of a cross section of the positive electrode plate 106. There is no particular limitation on the cross sectional shape of each primary particle 20, and it may be oblong, a polygonal shape other than oblong, circular, oval, or another complex shape in addition to the above shapes.

1. Constituent Material of Primary Particles 20

Each primary particle 20 is composed of a lithium complex oxide. A lithium complex oxide is an oxide that is expressed as $Li_xMO_2$ (wherein 0.05<x<1.10, and wherein M is at least one type of transition metal, and M typically includes one or more types of Co, Ni, Mn). A lithium complex oxide has a layered rock-salt structure. A layered rock-salt structure is a crystalline structure in which a lithium layer and a transition metal layer other than lithium are alternately layered to sandwich an oxygen layer, that is to say, a crystalline structure in which a transition metal ion layer is alternatively layered with a lithium single layer through an oxide ion (typically, an α-$NaFeO_2$ type structure, that is to say, a structure in which a transition metal and lithium are regularly ordered in an [111] axial direction of cubic crystal rock-salt structure).

A lithium complex oxide for example includes $Li_xCoO_2$ (lithium cobalt oxide), $Li_xNiO_2$ (lithium nickelate), $Li_xMnO_2$ (lithium manganate), $Li_xNiMnO_2$ (nickel-lithium manganate), $Li_xNiCoO_2$ (lithium-nickel-cobalt oxide), $Li_xCoNiMnO_2$ (lithium cobalt nickel manganate), $Li_xCoMnO_2$ (cobalt-lithium manganate), with $Li_xCoO_2$ in particular being preferred.

A lithium complex oxide may include one or more elements of Mg, Al, Si, Ca, Ti, V, Cr, Fe, Cu, Zn, Ga, Ge, Sr, Y, Zr, Nb, Mo, Ag, Sn, Sb, Te, Ba, Bi, W or the like.

2. Expansion-Contraction of Positive Electrode Plate 106

During charging and discharging of the lithium ion battery 100, lithium ions migrate in an inner portion each of primary particle 20 in a direction ("La Direction" in FIG. 2) that is parallel to the (003) plane. At that time, since each primary particle 20 expands and contracts in a direction ("Lb Direction" in FIG. 2) that is vertical to the (003) plane as a result of the intercalation and deintercalation of lithium ions during charging and discharging, the whole of the positive electrode plate 106 expands and contracts in a direction (referred to below as "plane face direction") that is parallel to the solid electrolyte-side surface 106a. In this manner, when the whole of the positive electrode plate 106 undergoes a shape change in a plate face direction, a tensile stress and shearing stress is produced in the solid electrolyte-side surface 106a that forms the interface with the solid electrolyte layer 107. When such a tensile stress and shearing stress is large, there is a risk that the positive electrode plate 106 will peel from the solid electrolyte layer 107.

In this context, in the present embodiment, the expansion-contraction ratio E of the positive electrode plate 106 in the plate face direction when fully charged can be suppressed to less than or equal to 0.5%. In this manner, since the tensile stress and shearing stress produced in the solid electrolyte-side surface 106a can be reduced, it is possible to suppress the generation of a defect in the solid electrolyte layer 107 or peeling of the positive electrode plate 106 from the solid electrolyte layer 107. The expansion-contraction ratio E of the positive electrode plate 106 is preferably less than or equal to 0.41%, more preferably less than or equal to 0.35%, and particularly preferably less than or equal to 0.30%.

As illustrated in FIG. 2, an orientation angle γ of each primary particle 20 relative to the plate face direction can be set to a desirable value from 0° to 90°. The orientation angle γ is an angle of inclination that the (003) plane of the primary particle 20 subtends relative to the plate face direction. A suitable value for the average value of the orientation angle γ of the plurality of primary particles 20 (referred to below as "average orientation angle θ") may be determined based on the material that constitutes each primary particle 20 and the reduction amount α in the composition ratio x of Li during charging.

For example, when each primary particle 20 is composed of $Li_xCoO_2$ (lithium cobalt oxide), and when the reduction amount α in the composition ratio x of Li when fully charged is greater than or equal to 0.1 and less than or equal to 0.7, the average orientation angle θ preferably satisfies Equation (1) below.

$$E = 2.56\alpha \times \sin\theta \qquad \text{Equation (1)}$$

Since the expansion-contraction ratio E as described above is less than or equal to 0.5%, for example, when the reduction amount α is 0.1, the average orientation angle θ is greater than 0° and less than or equal to 90°, and when the reduction amount α is 0.7, the average orientation angle θ is greater than 0° and less than or equal to 16°.

In this context, the average orientation angle θ is calculated based on the length distribution of the orientation angle γ of each primary particle 20 that is exposed in the solid electrolyte-side surface 106a in the EBSD (electron backscatter diffraction) image in a cross section of the positive electrode plate 106.

Figure 3:
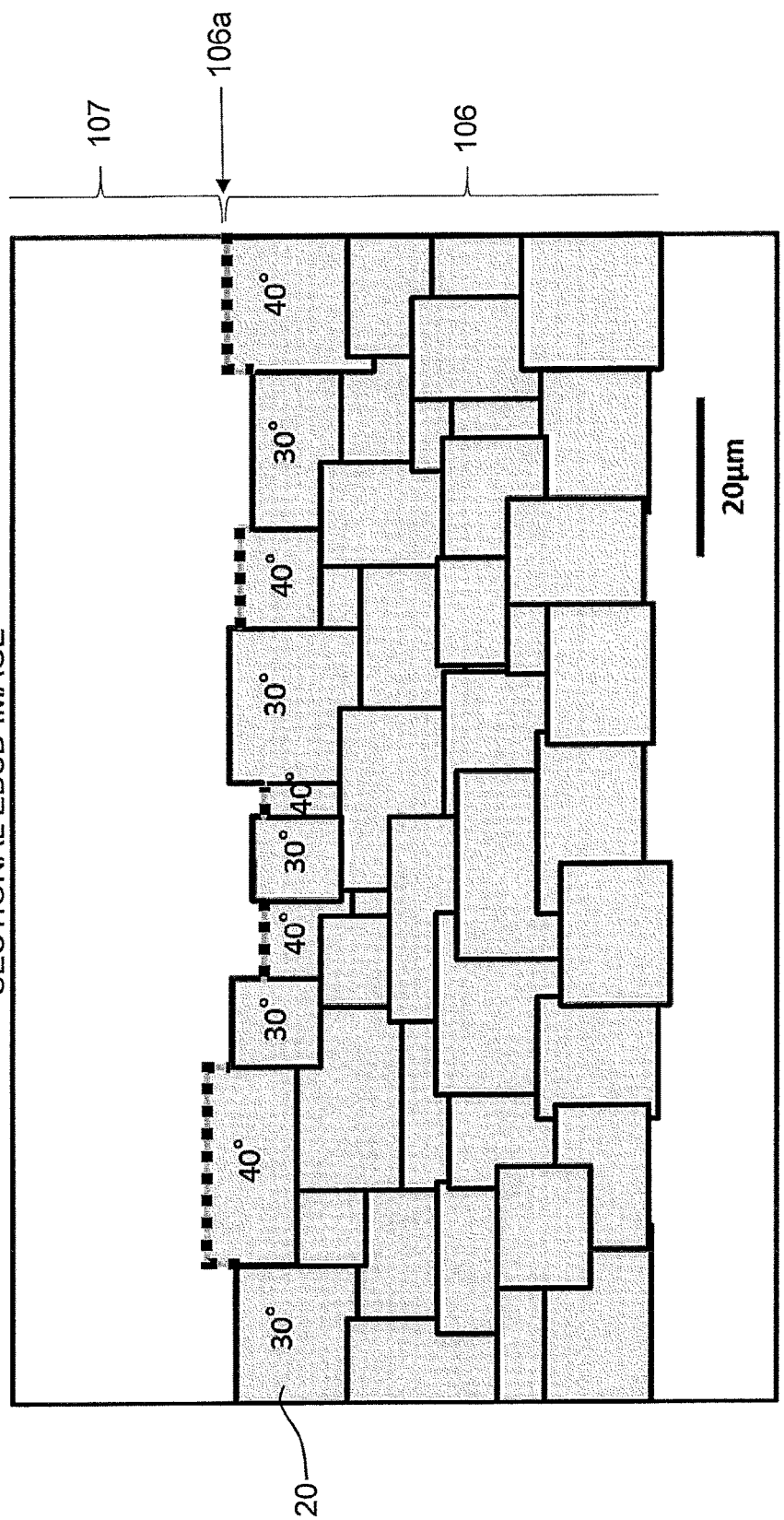
FIG. 3 illustrates a calculation method for the average orientation angle on the solid electrolyte layer-side surface of the positive electrode.

The calculation method for the average orientation angle θ will be described making reference to FIG. 3. FIG. 3 is an image of an EBSD observation in proximity to the solid electrolyte-side surface 106a in a cross section of the positive electrode plate 106.

Firstly as illustrated in FIG. 3, 10 cross sectional EBSD images are acquired to enable observation of 10 or more primary particles 20 that are exposed on the solid electrolyte-side surface 106a that makes contact with the solid electrolyte layer 107. In the image in FIG. 3, 10 primary particles 20 that are exposed on the solid electrolyte-side surface 106a are shown.

Next, 10 primary particles 20 that are exposed on the solid electrolyte-side surface 106a in the respective cross sectional EBSD images are arbitrarily selected. Next, a length distribution in the solid electrolyte-side surface 106a is calculated for each orientation angle γ (that is to say, the orientation angle relative to the plate face direction of the (003) plane)) of 10 selected primary particles 20 in each cross sectional EBSD image. In FIG. 3, the length of the orientation angle 30° in the solid electrolyte-side surface 106a is shown by the solid line, and the length of the orientation angle 40° in the solid electrolyte-side surface 106a is shown by the broken line.

The calculated average value for the orientation angle calculated based on the length distribution of a total of 100 primary particles 20 is taken to be the average orientation angle θ.

3. Distribution of Orientation Angle γ

The distribution of the orientation angle γ of each primary particle 20 is preferably narrow (that is to say, a small range). More specifically, from among the 100 primary particles 20 that are used in the calculation of the average orientation angle θ, the "length ratio" of the primary particles 20 that have an orientation angle γ within ±15° of the average orientation angle θ and occupy a line segment of the solid electrolyte-side surface 106a is preferably 40%, more preferably 51%, and particularly preferably 70%. In this manner, since the tensile stress and shearing stress produced in the solid electrolyte-side surface 106a can be further reduced, it is possible to further inhibit peeling of the positive electrode plate 106 from the solid electrolyte layer 107.

4. Average Number of Primary Particles 20 in Thickness Direction

It is preferred that there is a small number of primary particles 20 that are disposed in a thickness direction. In this manner, since the number of grain boundaries between the primary particles 20 that inhibit lithium ion conduction in the direction of lithium ion conduction can be reduced, lithium ion conduction can be enhanced. In this manner, the rate characteristics and cycle characteristics of the lithium ion battery 100 can be enhanced. In particular, when the thickness of the positive electrode plate 106 is high, the energy density of the lithium ion battery 100 can be increased in addition to the rate characteristics and cycle characteristics.

More specifically, when the thickness of the positive electrode plate 106 is greater than or equal to 50 μm, the average number of the primary particles 20 that are disposed in the thickness direction is preferably less than or equal to 6, and more preferably less than or equal to 5. The average number of the primary particles 20 that are disposed in the thickness direction is obtained drawing 5 lines parallel to the thickness direction at an arbitrary position in the SEM image of a cross section of the positive electrode plate 106 and an arithmetic average is calculated for the number of primary particles 20 that overlap the respective 5 lines.

Method of Manufacture of Positive Electrode Plate 106

Next, the method of manufacture of an $LiCoO_2$ sintered plate will be described as an example of a positive electrode plate 106. Firstly, after describing a first method of manufacture that facilitates a comparative increase in the average orientation angle θ of the primary particles 20, a second method of manufacture that facilitates a comparative decrease in the average orientation angle θ of the primary particles 20 will be described.

First Method of Manufacture

The first method of manufacture is applied when the average orientation angle θ is greater than or equal to 30°.

1. Preparation of Green Sheet

A mixed powder in which $Bi_2O_3$ is added to a $Co_3O_4$ starting material powder, a dispersing medium, a binder, a plasticizer, and a dispersing agent are mixed. Then, under reduced pressure, stirring and degassing of the mixture are performed, and the mixture is adjusted to a desired viscosity to thereby prepare a slurry.

A doctor blade method is applied to mold the prepared slurry on a PET film and thereby form a green sheet.

2. Preparation of Oriented Sintered Plate

A $Co_3O_4$ sintered plate is formed by placing the green sheet that was peeled from the PET film on a zirconia setter and firing (900° C. to 1400° C., 1 to 10 hours).

3. Preparation of Lithium Sheet

A $Li_3CO_4$ starting material powder, a binder, a plasticizer, and a dispersing agent are mixed. Then, under reduced pressure, stirring and degassing of the mixture are performed, and the mixture is adjusted to a desired viscosity to thereby prepare a slurry.

Next, a doctor blade method is applied to mold the prepared slurry on a PET film and thereby form a green sheet.

4. Introduction of Lithium

An $LiCoO_2$ sintered plate (positive electrode plate 106) was obtained by sandwiching the $Co_3O_4$ sintered plate from the top and the bottom by a lithium sheet, placing on a zirconia setter and firing (800° C. to 950° C. for 5 hours to 30 hours).

At that time, the average orientation angle θ of the primary particles 20 that configure the positive electrode plate 106 can be controlled by adjusting the concentration of the lithium atmosphere in the firing sheath. More specifically, the average orientation angle θ can be increased when the concentration of the lithium atmosphere is decreased and the average orientation angle θ can be decreased when the concentration of the lithium atmosphere is increased.

Furthermore, the average number in the thickness direction of the primary particles 20 that constitute the positive electrode plate 106 can be controlled by adjusting the concentration of the lithium atmosphere in the firing sheath. More specifically, when the concentration of the lithium atmosphere is increased, since it is possible to promote grain growth in each primary particle 20 by inhibiting the volatilization of a lithium compound from between the primary particles 20 during the reaction of the positive electrode plate and lithium in the lithium introduction step, the average number of primary particles 20 in the thickness direction can be reduced. On the other hand, when the concentration of the lithium atmosphere is decreased, since it is possible to inhibit grain growth in each primary particle 20 by volatilization of a lithium compound from between the primary particles 20, the average number of primary particles 20 in the thickness direction can be increased.

Furthermore, the average number of primary particles 20 in the thickness direction can be controlled by adjusting the firing temperature. More specifically, since grain growth is promoted when the firing temperature is increased, the average number of primary particles 20 in the thickness direction can be reduced, and when the firing temperature is reduced, grain growth is inhibited and therefore the average number of primary particles 20 in the thickness direction is increased.

The length ratio of the primary particles that have an orientation angle within a range of ±15° of the average orientation angle θ can be adjusted by controlling the number of primary particles 20 that constitute the positive electrode plate 106. The number of primary particles 20 can be controlled by adjusting the concentration of the lithium atmosphere in the firing sheath in the same manner as the average number of the primary particles 20 in the thickness direction as described above.

The concentration of the lithium atmosphere in the firing sheath can be adjusted by the Li concentration contained in the lithium sheet. However, adjustment is also possible by disposing an $LiCoO_2$ powder as a powder for formation of an atmosphere in the sheath. However, if the amount of the powder for formation of an atmosphere is excessive, it may be the case that the positive electrode plate 106 will stick to the setter as a result of residual lithium compounds not subjected to volatilization.

Second Method of Manufacture

The second method of manufacture is applied when the average orientation angle θ is greater than 0° and less than or equal to 30°.

1. Preparation of $LiCoO_2$ Template Particles

An $LiCoO_2$ powder is synthesized by mixing a $Li_2CO_3$ starting powder with a $Co_3O_4$ starting powder and firing (500° C. to 900° C., 1 to 20 hours). Plate-shaped $LiCoO_2$ particles are obtained by grinding the resulting $LiCoO_2$ powder using a ball mill to have a volume-based D50 particle diameter of 0.2 μm to 3 μm. This type of $LiCoO_2$ particle can be obtained by a method of synthesizing a plate-shaped crystal (a method of cracking after causing grain growth of a green sheet using a $LiCoO_2$ particle slurry, flux growth or hydrothermal synthesis, single crystal growth using melting, a sol-gel method or the like.).

2. Preparation of Matrix Particles

A $Co_3O_4$ starting powder is used as matrix particles. There is no particular limitation in relation to the volume-based D50 particle diameter of the $Co_3O_4$ starting material powder, and for example, it may be 0.1 to 1.0 μm. However, it is preferred that it is smaller than the volume-based D50 particle diameter of the template particles. The matrix particles can be obtained by thermal processing of the $Co(OH)_2$ starting material for 1 to 10 hours at 500° C. to 800° C. Furthermore, in addition to $Co_3O_4$, $Co(OH)_2$ particles, or $LiCoO_2$ particles may be used in the matrix particles.

3. Preparation of Green Sheet

A powder containing a mixture of template particles and matrix particles in a proportion of 100:3~3:97, a dispersing medium, a binder, a plasticizer, and a dispersing agent are mixed. Under reduced pressure, stirring and degassing of the mixture are performed, and the mixture is adjusted to a desired viscosity to thereby prepare a slurry. Then a doctor blade method is applied to mold the prepared slurry on a PET film and thereby form a green sheet.

4. Preparation of Oriented Sintered Plate

A $Co_3O_4$ sintered plate is formed by placing the green sheet that was peeled from the PET film on a zirconia setter and firing (500° C. to 900° C., 1 to 10 hours). Next the $Co_3O_4$ sintered plate is sandwiched from the top and the bottom by a lithium sheet and placed on a zirconia setter to thereby obtain an Li/Co ratio (molar ratio) of more than 0 and less than or equal to 1.0. After the setter is placed into an alumina sheath and subjected to thermal processing (700° C. to 850° C. for 1 hours to 20 hours) in an atmosphere of air, the $Co_3O_4$ sintered plate is sandwiched from the top and the bottom by a lithium sheet and subjected to further thermal processing (750° C. to 900° C. for 1 hours to 40 hours) to thereby obtain an $LiCoO_2$ sintered plate. The firing step may be separated into two steps, or may be performed on a single occasion.

Li in the lithium sheet that sandwiches the $Co_3O_4$ sintered plate preferably exhibits an excess of 0.1 times to 1.5 times relative to Co in the Li/Co ratio. As a result, it is possible to promote grain growth of the primary particles 20.

Furthermore, it is preferred that the heating conditions in the thermal processing are adjusted in response to the $Co_3O_4$ particle diameter. For example, when the $Co_3O_4$ particle diameter is less than or equal to 1 μm, it is preferred to retain the melted lithium sheet in the $Co_3O_4$ sintered plate by a temperature increase rate of 50° C./h to 200° C./h, or by a configuration in which after increasing the temperature to 600° C. to 850° C., the temperature is maintained for 1 hour to 10 hours. In this manner, the particle diameter of the primary particles 20 can be increased, and the average number of primary particles 20 in the thickness direction can be reduced.

Other Embodiments

The present invention is not limited to the above embodiment, and various changes or modifications may be added within a scope that does not depart from the scope of the invention.

In the above embodiment, although an example has been explained in which there is application of the plate-shaped lithium composite oxide according to the present invention to the positive electrode plate 106 of a lithium ion battery 100, application is also possible of the plate-shaped lithium composite oxide to other battery configurations.

For example, the plate-shaped lithium composite oxide according to the present invention can be used in a lithium ion battery using an electrolyte such as an ionic liquid, a polymer electrolyte, a gel electrolyte, or an organic liquid electrolyte. An ionic liquid is also termed an ordinary temperature molten salt, and is a salt that combines a cation and an anion. The ionic liquid includes an ionic liquid that contains a quaternary ammonium-based cation and an ionic liquid that contains an imidazolium-based cation.

Examples

Although the examples of a lithium ion battery according to the present invention will be described below, the present invention is not thereby limited to the following examples.
Sample No. 1
1. Preparation of Green Sheet A $Co_3O_4$ starting material powder (volume-based D50 particle diameter 0.3 μm, manufactured by Seido Chemical Industry Co., Ltd.) was added in a ratio of 5 wt % to $Bi_2O_3$ (volume-based D50 particle diameter 0.3 μm, manufactured by Taiyo Koko Co., Ltd.) to obtain a mixed powder. 100 parts by weight of the mixed powder was mixed with 100 parts by weight of a dispersion medium (toluene:isopropanol=1:1), 10 parts by weight of a binder (polyvinyl butyral: No. BM-2, manufactured by Sekisui Chemical Co., Ltd.), 4 parts by weight of a plasticizer (DOP: di(2-ethylhexyl) phthalate manufactured by Kurogane Kasei Co., Ltd.) and 2 parts by weight of a dispersing agent (product name: RHEODOL SP-O30, manufactured by Kao Corporation). The mixture was stirred under reduced pressure, degassed, and the viscosity was adjusted to 4000 cP to thereby prepare a slurry. The viscosity was measured with an LVT viscometer manufactured by Brookfield. As described above, the resulting slurry was formed into a sheet shaped configuration on a PET film using a doctor blade method to thereby have a thickness after drying of 52 μm.

2. Preparation of Oriented Sintered Plate

The green sheet that was peeled from the PET film is cut into 30 mm square using a cutter. The cut green sheet is placed in the center of an embossed zirconia setter (dimension 90 mm square, thickness 1 mm) having a projection size of 300 μm, and after firing for 5 hours at 1300° C., the temperature was reduced at a temperature reduction rate of 50° C./h to thereby obtain the portion that is not adhered to the setter as a $Co_3O_4$ sintered plate.

3. Preparation of Lithium Sheet 100 parts by weight of an $Li_2CO_3$ starting material powder (volume-based D50 particle diameter 2.5 μm, manufactured by Honjo Chemical Corporation) was mixed with 100 parts by weight of a dispersion medium (toluene:isopropanol=1:1), 5 parts by weight of a binder (polyvinyl butyral: No. BM-2, manufactured by Sekisui Chemical Co., Ltd.), 2 parts by weight of a plasticizer (DOP: di(2-ethylhexyl) phthalate manufactured by Kurogane Kasei Co., Ltd.) and 2 parts by weight of a dispersing agent (product name: RHEODOL SP-O30, manufactured by Kao Corporation). The mixture was stirred under reduced pressure, degassed, and the viscosity was adjusted to 4000 cP to thereby prepare a slurry. The viscosity was measured with an LVT viscometer manufactured by Brookfield. As described above, the resulting slurry was formed into a sheet shaped configuration on a PET film using a doctor blade method to thereby have a thickness after drying of 25 μm.

4. Introduction of Lithium

Figure 4:
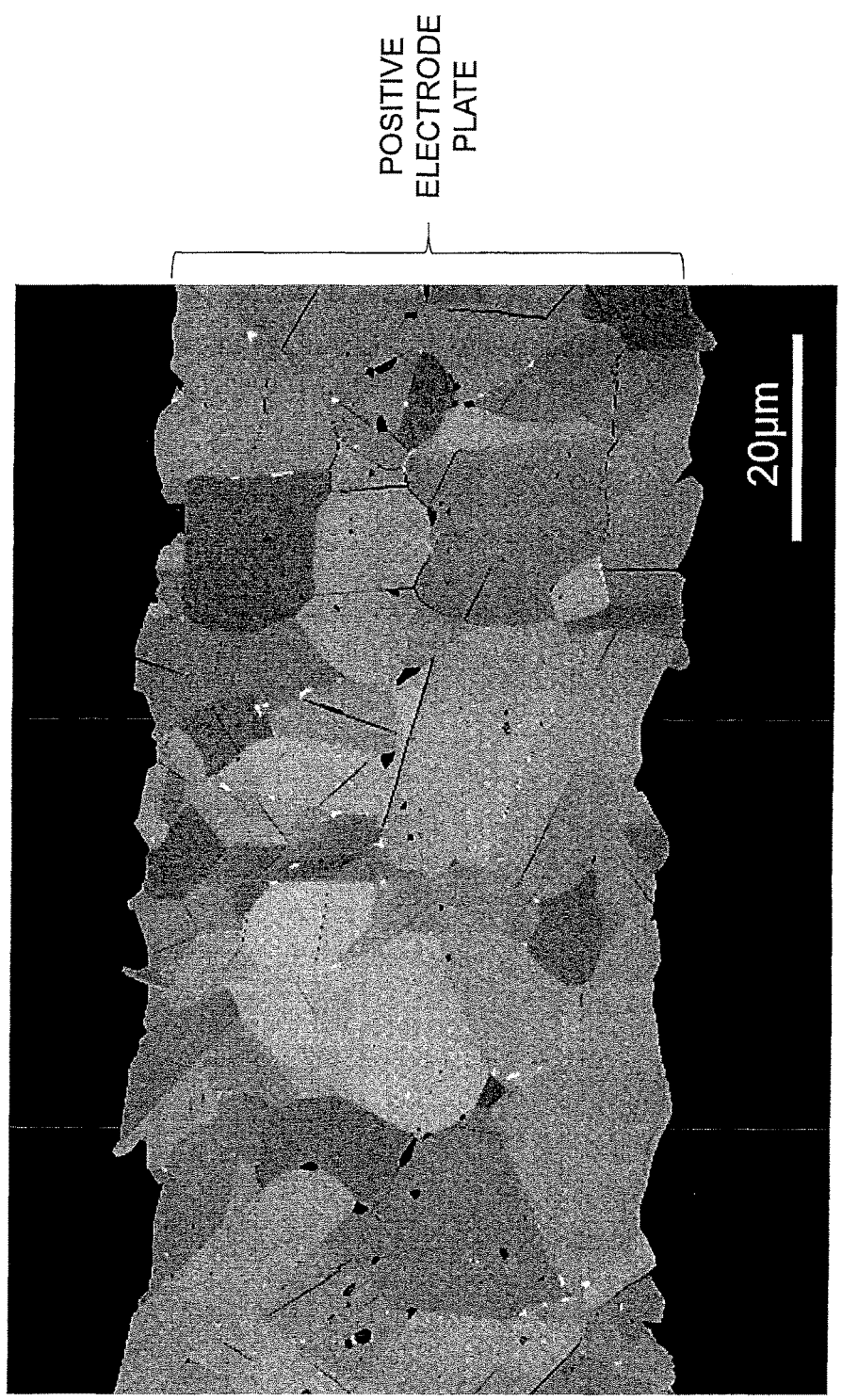
FIG. 4 is a cross sectional SEM image showing the positive electrode in Sample No. 1.

The $Co_3O_4$ sintered plate was sandwiched from the top and the bottom by a lithium sheet and placed in a zirconia setter so that the Li/Co ratio coincided with 1.3. The setter was placed in a 90 mm square alumina sheath, then 5 g of $LiCoO_2$ powder was placed in the sheath as an atmosphere creating powder and a seal was created. The sheath was subjected to thermal processing at 900° C. for 20 hours in an atmosphere of air to thereby obtain a $LiCoO_2$ sintered plate. FIG. 4 is a cross sectional SEM image of a $LiCoO_2$ sintered plate in Sample No. 1.

5. Preparation of Positive Electrode

An epoxy-based conductive adhesive containing a dispersion of conductive carbon was used to fix the $LiCoO_2$ sintered plate to the stainless steel current collecting plate and thereby prepare a positive electrode.

6. Preparation of Solid Electrolyte Layer

A lithium phosphate sintered body target having a diameter of 4 inches (about 10 cm) was prepared, and sputtering was executed using a sputtering apparatus (SPF-430H manufactured by Canon Anerva Corporation) in an RF magnetron configuration to form a film thickness of 2 μm using a gas species of $N_2$ at 0.2 Pa and an output of 0.2 kW. In this manner, a LiPON-type solid electrolyte sputter film having a thickness of 2 μm is formed on $LiCoO_2$ sintered plate.

7. Preparation of Lithium Ion Battery

A 500 Å Au film was formed on the solid electrolyte layer by sputtering using an ion sputtering apparatus (JFC-1500 manufactured by JEOL Ltd).

A lithium metal foil and Cu foil were placed on an Au film, and pressure bonding was performed on a hot plate having a temperature of 200° C. and disposed in a glove box having an Ar atmosphere.

In this manner, a unit battery having a positive electrode/solid electrolyte layer/negative electrode (size: 10 mm×10 mm) was obtained. In addition, a lithium ion battery was formed by sealing the unit battery in an Al laminate film in an Ar atmosphere.

Sample No. 2

In Sample No. 2, with the exception that the amount of $LiCoO_2$ powder placed into the sheath as an atmosphere creating powder during introduction of lithium was 10 g, a lithium ion battery was formed using the same steps as those disclosed in relation to Sample No. 1.

Sample No. 3

In Sample No. 3, with the exception that the amount of $LiCoO_2$ powder placed into the sheath as an atmosphere creating powder during introduction of lithium was 15 g and the thermal processing temperature was 840° C., a lithium ion battery was formed using the same steps as those disclosed in relation to Sample No. 1.

Sample No. 4

In Sample No. 4, with the exception that the amount of $LiCoO_2$ powder placed into the sheath as an atmosphere creating powder during introduction of lithium was 10 g and the thermal processing temperature was 840° C., a lithium ion battery was formed using the same steps as those disclosed in relation to Sample No. 1.

Sample No. 5

In Sample No. 5, with the exception that the thermal processing temperature was 840° C. during lithium introduction, a lithium ion battery was formed using the same steps as those disclosed in relation to Sample No. 1.

Sample No. 6

In Sample No. 6, with the exception that the thermal processing temperature was 840° C. during introduction of lithium, and the atmosphere in the sheath was an $O_2$ atmosphere, a lithium ion battery was formed using the same steps as those disclosed in relation to Sample No. 1.

Sample No. 7

In Sample No. 7, with the exception that an atmosphere creating powder was not included during introduction of lithium and that the thermal processing temperature was 840° C., a lithium ion battery was formed using the same steps as those disclosed in relation to Sample No. 1.

Sample No. 8

In Sample No. 8, with the exception that an atmosphere creating powder was not included during introduction of lithium, the seal of the sheath remained open, and the thermal processing temperature was 840° C., a lithium ion battery was formed using the same steps as those disclosed in relation to Sample No. 1.

Sample No. 9

In Sample No. 9, with the exception that an atmosphere creating powder was not included during introduction of lithium and the thermal processing temperature was 880° C., a lithium ion battery was formed using the same steps as those disclosed in relation to Sample No. 1.

Sample No. 10

1. Preparation of Template Particles

A $Co_3O_4$ starting material powder (volume-based D50 particle diameter 0.8 μm, manufactured by Seido Chemical Industry Co., Ltd.) and $Li_2CO_3$ starting material powder (volume-based D50 particle diameter 2.5 μm, manufactured by Honjo Chemical Corporation) were mixed and fired for 5 hours at 800° C. to synthesize a $LiCoO_2$ powder. The resulting $LiCoO_2$ powder was subjected to grinding for 40 hours in a ball mill to thereby obtain plate-shaped $LiCoO_2$ particles having a volume-based D50 particle diameter 1.0 μm.

2. Preparation of Matrix Particles

A $Co_3O_4$ starting material powder (volume-based D50 particle diameter 0.3 μm manufactured by Seido Chemical Industry Co., Ltd.) was used as a matrix particle.

3. Preparation of Green Sheet

The template particles and matrix particles were mixed so that the weight ratio coincided with 60:40. 100 parts by weight of the mixed powder was mixed with 100 parts by weight a dispersion medium (toluene:isopropanol=1:1), 10 parts by weight of a binder (polyvinyl butyral: No. BM-2, manufactured by Sekisui Chemical Co., Ltd.), 4 parts by weight of a plasticizer (DOP: di(2-ethylhexyl) phthalate manufactured by Kurogane Kasei Co., Ltd.) and 2 parts by weight of a dispersing agent (product name: RHEODOL SP-O30, manufactured by Kao Corporation). The mixture was stirred under reduced pressure, degassed, and the viscosity was adjusted to 10000 cP to thereby prepare a slurry. The viscosity was measured with an LVT viscometer manufactured by Brookfield. As described above, the resulting slurry was formed into a sheet shaped configuration on a PET film using a doctor blade method to thereby have a thickness after drying of 40 μm.

4. Preparation of Oriented Sintered Plate

A $Co_3O_4$ sintered plate was formed by placing the green sheet that was peeled from the PET film on a zirconia setter and firing (900° C., 5 hours). Next the $Co_3O_4$ sintered plate was sandwiched from the top and the bottom by a lithium sheet and placed on a zirconia setter so that the synthesized lithium sheet has an Li/Co ratio of 1.0. After the setter was placed into a 90 mm square alumina sheath and subjected to thermal processing (800° C. for 5 hours) in an atmosphere of air, a further step of sandwiching from the top and the bottom by a lithium sheet and subjecting to thermal processing (900° C. for 20 hours) was performed to thereby obtain an $LiCoO_2$ sintered plate.

Sample No. 11

Figure 5:
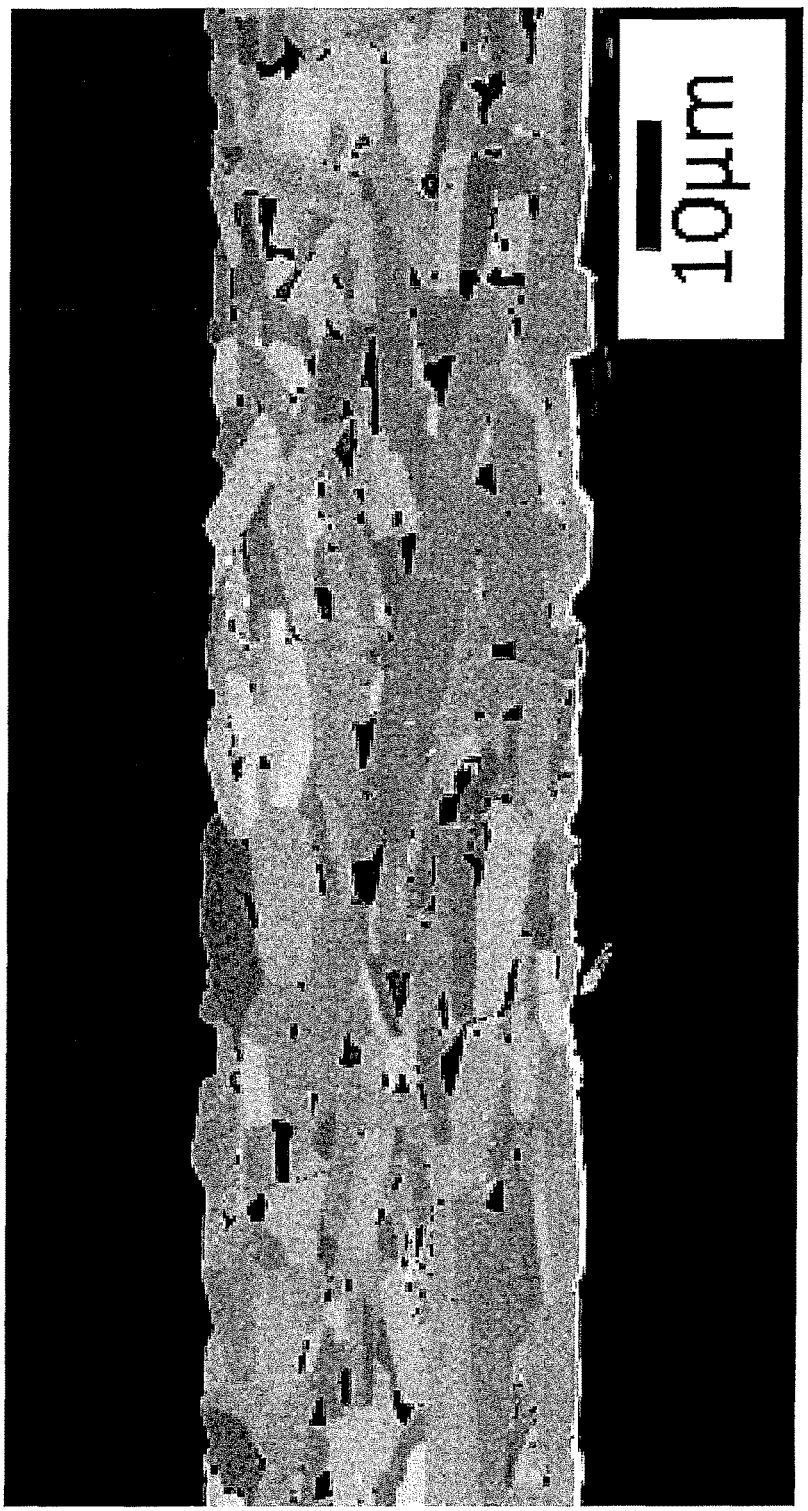
FIG. 5 is a cross sectional SEM image showing the positive electrode in Sample No. 11.

With the exception that the grinding time of the template particles was 30 hours and the weight ratio of the template particles and matrix particles was 50:50, an $LiCoO_2$ sintered plate was formed using the same steps as those disclosed in relation to Sample No. 10. FIG. 5 is a cross sectional SEM image of the $LiCoO_2$ sintered plate according to Sample No. 11.

Sample No. 12

With the exception that the plate thickness was 30 μm, an $LiCoO_2$ sintered plate was formed using the same steps as those disclosed in relation to Sample No. 9.

Sample No. 13

Firstly, in the same manner as Sample No. 10, plate-shaped $LiCoO_2$ particles were prepared as template particles.

Next a $LiOH.H_2O$ powder (manufactured by Wako Pure Chemical Industries, Ltd.) was mixed with the $Co_3O_4$ starting material powder of Sample No. 10 so that the Li/Co ratio was 1.0, the mixture was placed in a 90 mm square alumina sheath and subjected to thermal processing in an atmosphere of air (650° C., 5 hours) to thereby obtain matrix particles in the form of $LiCoO_2$ particles having a volume-based D50 particle diameter of 0.3 μm.

Next, a green sheet was obtained by the same method as Sample No. 10 by adjusting the slurry to have a weight ratio of template particles and matrix particles of 75:25.

Next, a green sheet was sandwiched by a lithium sheet so that the Li/Co ratio was 1.5 (Li/Co ratio 1.0 in the green sheet and a residual Li/Co ratio of 0.5 in the lithium sheet), and after retaining at 800° C. for 5 hours, thermal processing was performed at 900° C. for 20 hours to thereby obtain an $LiCoO_2$ sintered plate.

Measurement of Orientation Angle

Firstly, 10 cross sectional EBSD images were acquired to enable observation of 10 or more primary particles that are exposed on the solid electrolyte-side surface that makes contact with the solid electrolyte of the $LiCoO_2$ sintered plate. Then 10 primary particles that are exposed on the solid electrolyte-side surface were arbitrarily selected in each cross sectional EBSD image. The respective cross sectional EBSD images were acquired by use of an FE-SEM SU5000 manufactured by Hitachi High-Technologies Corporation, an EBSD NordlyNano detector manufactured by Oxford Instruments, at a magnification of 1000 times (observation range about 130 μm×about 100 μm).

Figure 6:
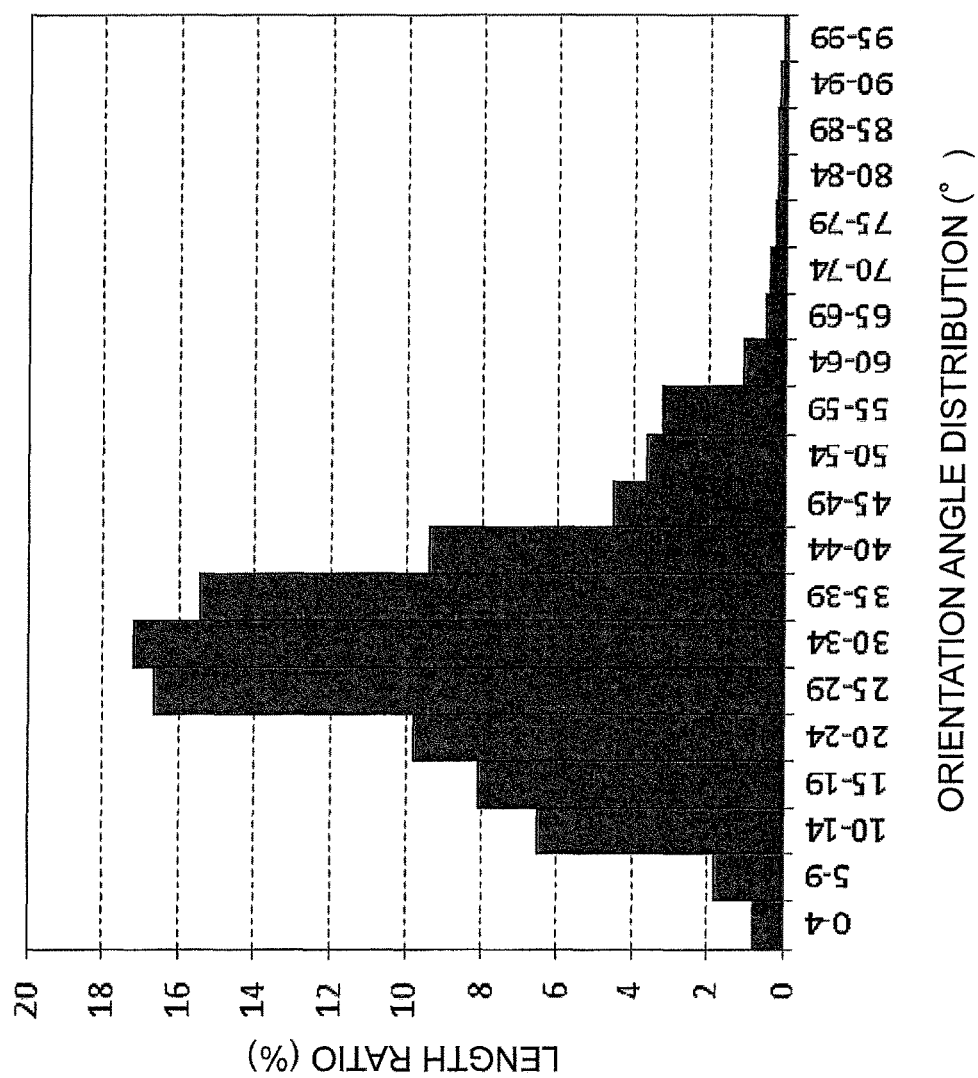
FIG. 6 is a histogram illustrating the length ratio of the orientation angle for Sample No. 1.

Next, the length distribution in the solid electrolyte-side surface was calculated in relation to each orientation angle of the selected 10 primary particles in each cross sectional EBSD image. The average orientation angle is calculated as the arithmetic mean of the orientation angles calculated based on the length distribution of a total of 100 primary particles. FIG. 6 is a histogram illustrating the length ratio of the orientation angle for Sample No. 1.

Next, as shown in Equation (1) below, a reduction amount α in the composition ratio x of Li when fully charged was taken to be 0.3 and a calculated average orientation angle θ was substituted to thereby calculate an expansion-contraction ratio E in a plate face direction of the positive electrode plate. The calculation results are shown in Table 1.

$$E = 2.56\alpha x \sin\theta \qquad \text{Equation (1)}$$

The length ratio is calculated for the primary particles that have an orientation angle within ±15° of the average orientation angle θ of the 100 primary particles that were used in the calculation of the average orientation angle θ. The calculation results are shown in Table 1.

Average Number of Primary Particles in Thickness Direction

FIG. 7 illustrates a method of calculating the average number of primary particles using the SEM image in FIG. 4.

After exposing a cross section in a thickness direction of the positive electrode plate by CP polishing, a cross section was observed by SEM. In the cross sectional SEM image, 5 lines were drawn parallel to the thickness direction at an arbitrary position and an arithmetic average was calculated for the number of primary particles that overlap the respective 5 lines. The calculation results are shown in Table 1.

Battery Evaluation

After charging the lithium ion battery according to Sample No. 1 to No. 9 to 4.05[V] using a 0.1 [mA] constant current, charging was performed using a constant voltage to a current of 0.05 [mA]. Then discharging was performed using a 0.02 [mA] constant current to 3.0 [V] and the discharge capacity W0 was measured. Then, after repeating this operation 10 times, the discharge capacity W10 was measured. A capacity maintenance rate was calculated by dividing the discharge capacity W10 by the discharge capacity W0. The calculation results are shown in Table 1.

After charging the lithium ion battery according to Sample No. 10 to No. 13 to 4.2 [V] using a 0.1 [mA] constant current, charging was performed using a constant voltage to a current of 0.05 [mA]. Then discharging was performed using a 0.1 [mA] constant current to 3.0 [V] and the discharge capacity W0 was measured. Then, after repeating this operation 10 times, the discharge capacity W10 was measured. A capacity maintenance rate was calculated by dividing the discharge capacity W10 by the discharge capacity W0. The calculation results are shown in Table 1.

TABLE 1

| Sample No | Average Orientation Angle θ (°) | Length Ratio of Orientation Angle within ±15° Average of Orientation Angle θ (%) | Expansion-Contraction Coefficient E (%) | Plate Thickness (μm) | Average Number of Primary Particles in Thickness Direction (units) | Discharge Capacity (mAh/g) | Capacity Maintenance Rate (%) |
|---|---|---|---|---|---|---|---|
| 1 | 32 | 59 | 0.4 | 50 | 5 | 80 | 98% |
| 2 | 27.4 | 65 | 0.35 | 50 | 2 | 81 | 99% |
| 3 | 22.9 | 53 | 0.38 | 50 | 4 | 81 | 98% |
| 4 | 30.1 | 42 | 0.5 | 50 | 5 | 78 | 94% |
| 5 | 33.8 | 66 | 0.41 | 51 | 12 | 67 | 98% |
| 6 | 5.6 | 51 | 0.21 | 51 | 8 | 48 | 99% |
| 7 | 52.8 | 31 | 0.64 | 50 | 21 | 81 | 74% |
| 8 | 50.6 | 44 | 0.59 | 50 | 15 | 81 | 82% |
| 9 | 78.2 | 39 | 0.72 | 51 | 9 | 80 | 34% |
| 10 | 10.5 | 79 | 0.12 | 30 | 11 | 80 | 99% |
| 11 | 15.4 | 90 | 0.15 | 30 | 9 | 85 | 99% |
| 12 | 78.2 | 39 | 0.72 | 30 | 6 | 50 | 20% |
| 13 | 16.3 | 85 | 0.13 | 50 | 2 | 80 | 99% |

As shown in Table 1, it is possible to achieve a superior capacity maintenance rate of greater than or equal to 90% in Sample No. 1 to 6, 10 to 11, and 13 in which the expansion-contraction ratio E in a plate face direction of the positive electrode plate is less than or equal to 0.5%. This feature is due to the fact that peeling of the positive electrode plate from the solid electrolyte layer or defects in the solid electrolyte layer are inhibited as a result of a reduction of stress produced in the interface between the positive electrode plate and the solid electrolyte layer by reducing the value of the expansion-contraction ratio E in the plate surface of the positive electrode plate.

Furthermore as shown in Table 1, it is possible to further enhance the capacity maintenance ratio in Sample No. 1 to 3, 5 to 6, 10 to 11, and 13 in which the length ratio of primary particles that have an orientation angle within ±15° of the average orientation angle θ is greater than or equal to 51% when compared with Sample No. 4 in which the ratio is 42%. This feature is due to the fact that peeling of the positive electrode plate from the solid electrolyte layer, defects in the solid electrolyte layer due to localized expansion at a position at which particles having a large orientation angle are present are inhibited as a result of a reduction of particles having a large orientation angle that are exposed on the positive electrode plate surface by narrowing the distribution of the orientation angle of each primary particle.

Furthermore as shown in Table 1, it is possible to enhance the discharge capacity in Sample No. 1 to 5, 10 to 11 and 13 in which the average orientation angle is greater than or equal to 10.5° when compared to Sample No. 6 in which the average orientation angle is 5.6°. This feature is due to superior intercalation and deintercalation of lithium ions in a thickness direction as a result of an average orientation angle is greater than or equal to 10.5°.

As shown in Table 1, it is possible to enhance the discharge capacity in Sample No. 1 to 4 in which the thickness of the positive electrode plate is greater than or equal to 50 μm by a configuration in which the average number of primary particles per 50 μm thickness is less than or equal to 5 in comparison with Sample No. 5 in which the average number is 12. This feature is due to the fact that the lithium ion conductivity in a thickness direction is enhanced by reducing the average number of primary particles disposed in a thickness direction.

INDUSTRIAL APPLICABILITY

The plate-shaped lithium composite oxide according to the present invention inhibits peeling of the positive electrode and/or defects in the solid electrolyte layer and therefore finds application in the field of lithium ion batteries.

The invention claimed is:

1. A plate-shaped lithium composite oxide for use as a positive electrode of a lithium ion battery provided with a solid electrolyte layer,
the plate-shaped lithium composite oxide comprising a plurality of mutually bonded primary particles respectively composed of a lithium composite oxide having a layered rock-salt structure,
an average orientation angle θ of the plurality of mutually bonded primary particles relative to a plate face direction is greater than or equal to 5.6° and less than or equal to 30°, wherein the average orientation angle θ is a calculated average value for an orientation angle γ of each of the plurality of primary particles that are exposed in a solid electrolyte-side surface in an EBSD image in a cross section of the positive electrode, the orientation angle γ being an angle of inclination that the (003) plane of each of the plurality of primary particles subtends relative to the plate face direction, and
an expansion-contraction ratio E of the fully charged plate-shaped lithium composite oxide to the full discharged plate-shaped lithium composite oxide in the plate face direction parallel to a plate face is less than or equal to 0.5%.

2. The plate-shaped lithium composite oxide according to claim 1, wherein
the lithium composite oxide is $LiCoO_2$, and
an average orientation angle θ of the plurality of primary particles relative to the plate face direction satisfies Equation (1) below when a reduction amount α in the composition ratio x of Li when charged is greater than or equal to 0.1 and less than or equal to 0.7.

$$E = 2.56 \alpha \times \sin \theta \qquad \text{Equation (1)}$$

3. The plate-shaped lithium composite oxide according to claim 1, wherein
a length ratio of the plurality of primary particles which have an orientation angle within ±15° of the average orientation angle θ of the plurality of primary particles in a cross section of the plate face is greater than or equal to 51%.

4. The plate-shaped lithium composite oxide according to claim 1, wherein
a thickness in a thickness direction vertical to the plate face direction is greater than or equal to 50 μm, and
an average number of the plurality of primary particles disposed per 50 μm thickness is less than or equal to 6.

* * * * *